United States Patent
Khan et al.

(10) Patent No.: US 10,642,702 B1
(45) Date of Patent: May 5, 2020

(54) MECHANISM FOR FASTER CONTROL PLANE SWITCHOVER

(71) Applicant: Juniper Networks, Inc., Sunnyvale, CA (US)

(72) Inventors: Tabrez Ahmed Khan, Bangalore (IN); Manoj Nayak, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 160 days.

(21) Appl. No.: 16/014,749

(22) Filed: Jun. 21, 2018

(51) Int. Cl.
  *G06F 11/00* (2006.01)
  *G06F 11/20* (2006.01)
  *H04L 29/14* (2006.01)

(52) U.S. Cl.
  CPC ...... *G06F 11/2028* (2013.01); *G06F 11/2005* (2013.01); *G06F 11/2007* (2013.01); *H04L 69/40* (2013.01)

(58) Field of Classification Search
  CPC ..... H04L 43/0823; H04L 43/10; H04L 45/38; H04L 45/54; H04L 45/745; H04L 41/0654–0672; H04L 41/0813; H04L 41/0816; G06F 11/2005; G06F 11/2007; G06F 11/2028
  See application file for complete search history.

(56) References Cited

U.S. PATENT DOCUMENTS

| | | | | |
|---|---|---|---|---|
| 2002/0099972 | A1* | 7/2002 | Walsh | G06F 11/2005 714/10 |
| 2005/0050136 | A1* | 3/2005 | Golla | H04L 45/02 709/200 |
| 2006/0072480 | A1* | 4/2006 | Deval | H04L 1/22 370/254 |
| 2007/0076591 | A1* | 4/2007 | Khan | H04L 12/4625 370/216 |
| 2011/0134931 | A1* | 6/2011 | Merwe | H04L 41/0816 370/401 |
| 2015/0006953 | A1* | 1/2015 | Holbrook | G06F 11/0724 714/13 |
| 2019/0230031 | A1* | 7/2019 | Mahishi | G06F 9/545 |

* cited by examiner

*Primary Examiner* — Michael Maskulinski
(74) *Attorney, Agent, or Firm* — Harrity & Harrity, LLP

(57) ABSTRACT

A network device may detect an event associated with a first control plane component included in the network device. The network device may, based on detecting the event, deactivate a first master control plane address configuration stored in a first cache on the first control plane component, and activate a second master control plane address configuration that was stored, prior to the event being detected, in a second cache on a second control plane component included in the network device. The network device may establish, using the activated second master control plane address configuration stored in the second cache on the second control plane component, a connection between the second control plane component and a data plane component included in the network device.

20 Claims, 12 Drawing Sheets

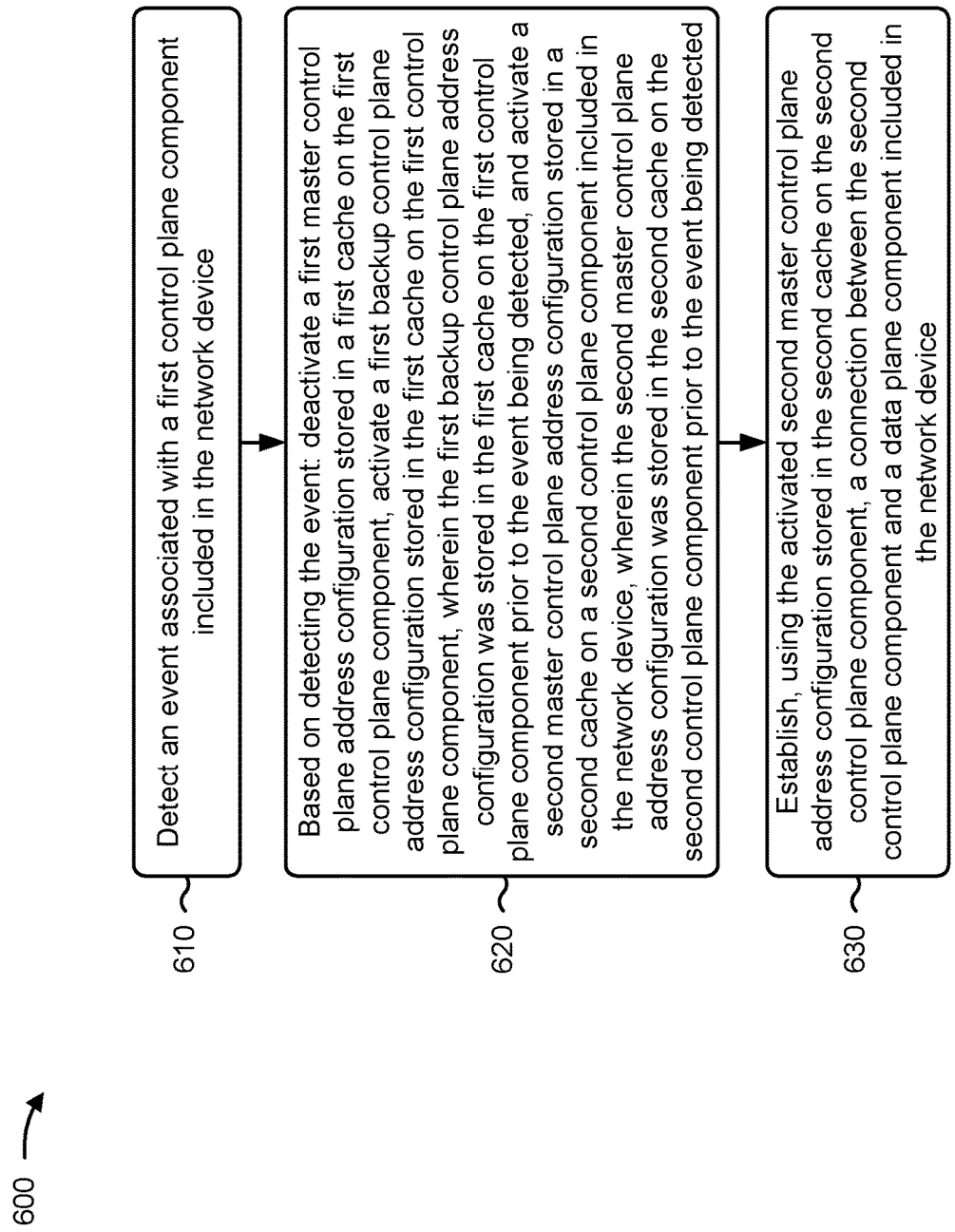

MECHANISM FOR FASTER CONTROL PLANE SWITCHOVER

BACKGROUND

A network device may include a control plane component and a data plane component, among other components. The control plane component may be responsible for populating a routing information base (RIB) for processing packets received at the network device, populating a forwarding information base (FIB) based on information included in the RIB, participating in one or more routing protocols, and/or the like. The data plane component may receive the packets, forward the packets based on the information included in the RIB and/or the information included in the FIB, and/or the like.

SUMMARY

According to some implementations, a device may include one or more memories, and one or more processors to detect an event associated with a first control plane component included in the network device. The one or more processors may, based on detecting the event, deactivate a first master control plane address configuration stored in a first cache on the first control plane component, and activate a second master control plane address configuration stored in a second cache on a second control plane component included in the network device, wherein the second master control plane address configuration was stored in the second cache on the second control plane component prior to the event being detected. The one or more processors may establish, using the activated second master control plane address configuration stored in the second cache on the second control plane component, a connection between the second control plane component and a data plane component included in the network device.

According to some implementations, a non-transitory computer-readable medium may store instructions that include one or more instructions that, when executed by one or more processors, cause the one or more processors to detect an event associated with a first control plane component included in the network device, wherein the first control plane component includes a first cache, and wherein the first control plane component stores a first master control plane address configuration in an active state in the first cache. The one or more instructions may cause the one or more processors to, based on detecting the event, deactivate the first master control plane address configuration stored in the first cache on the first control plane component, and activate a second master control plane address configuration stored in a second cache on a second control plane component included in the network device, wherein the second master control plane address configuration was stored in the second cache on the second control plane component prior to the event being detected. The one or more instructions may cause the one or more processors to establish, using the activated second master control plane address configuration stored in the second cache on the second control plane component, a connection between the second control plane component and a data plane component included in the network device.

According to some implementations, a method may include detecting, by a network device, an event associated with a first control plane component included in the network device. The method may include, based on detecting the event, deactivating, by the network device, a first master control plane address configuration stored in a first cache on the first control plane component, activating, by the network device, a first backup control plane address configuration stored in the first cache on the first control plane component, wherein the first backup control plane address configuration was stored in the first cache on the first control plane component prior to the event being detected, and activating, by the network device, a second master control plane address configuration stored in a second cache on a second control plane component included in the network device, wherein the second master control plane address configuration was stored in the second cache on the second control plane component prior to the event being detected. The method may include establishing, by the network device using the activated second master control plane address configuration stored in the second cache on the second control plane component, a connection between the second control plane component and a data plane component included in the network device.

BRIEF DESCRIPTION OF THE DRAWINGS

FIG. 6 is a flow chart of an example process for control plane switchover.

DETAILED DESCRIPTION

Figure 1A:
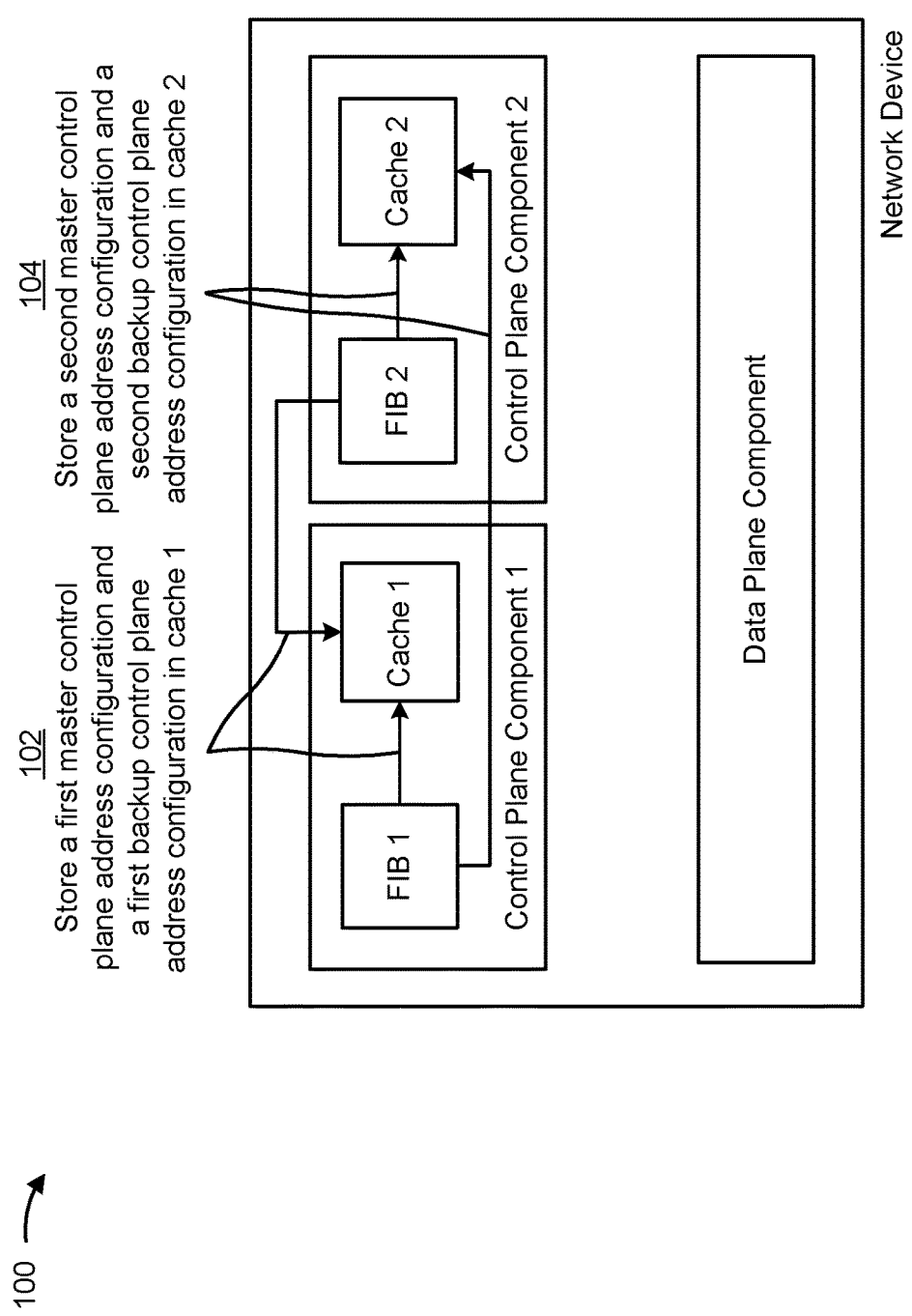
FIGS. 1A-1G are diagrams of an example implementation described herein.

The following detailed description of example implementations refers to the accompanying drawings. The same reference numbers in different drawings may identify the same or similar elements.

In some cases, a network device may include a plurality of control plane components, such as a first control plane component and a second control plane component, communicatively connected to a data plane component. The plurality of control plane components may be used for various purposes. One purpose may be redundancy; the first control plane component may function as a master control plane and the second control plane component may function as a backup control plane, and the second control plane component may take over as the master control plane (referred to herein as switchover) based on the occurrence of an event associated with the first control plane component.

In some situations, a network device may switch over the master control plane from the first control plane component to the second control plane component by migrating (or transferring) a master control plane address configuration from the first control plane component to the second control plane component. To do so, the network device may disconnect the first control plane component from the data plane component. The network device may release a master control plane address from the first control plane component and may release a backup control plane address from the second control plane component. The network device may reassign the master control plane address to the second control plane component, may transfer the master control plane address configuration from the first control plane component to the second control plane component, and may populate a FIB included in the second control plane component with the master control plane address configuration (which makes the second control plane component the master control plane component). Similarly, the network device may reassign the backup control plane address to the first control plane component, may transfer the backup control plane address configuration from the second control plane component to the first control plane component, and may populate a FIB included in the first control plane component with the backup control plane address configuration (which makes the first control plane component the backup control plane component). The network device may then connect the second control plane component to the data plane component so that the second control plane component may act as the master control plane for the data plane component.

During the time between the network device disconnecting the first control plane component from the data plane component, and the network device connecting the second control plane component to the data plane component, the data plane component has no control plane component to which the data plane component can communicate. As a result, the data plane component will not receive any routing and/or network topology updates from either the first control plane component or the second control plane component while the data plane component is disconnected from the first control plane component and the second control plane component. In addition, if the migration of the master control plane address configuration and the backup control plane address configuration between the first control plane component and the second control plane component takes too long (e.g., more than a threshold amount of time), the data plane component may determine that the network device has no functional master control plane, and the data plane component may therefore perform a reset of the data plane component, which can cause other events and/or failures in neighbor devices.

Moreover, in some cases, the time duration it takes to migrate the master control plane address configuration from the first control plane component to the second control plane component, and to migrate the backup control plane address configuration from the second control plane component to the first control plane component, may cause delays in one or more routing protocols, which may exceed timing tolerances of the one or more routing protocols. As a result, a neighbor device may determine that the network device has failed. For example, a delay in the migration may cause bidirectional forwarding detection (BFD) protocol packets being exchanged between the network device and the neighbor device to be delayed, which may cause the neighbor device to determine that the network device has failed (and/or vice-versa). Accordingly, the neighbor device may seek alternative routes around the network device in a network, which can further cause delays in the network.

Some implementations described herein provide a network device that is capable of reducing the time it takes to switch over a master control plane address configuration from a first control plane component to second control plane component. The network device may store a first master control plane address configuration and a first backup control plane address configuration in a first cache (or another type of data structure) on the first control plane component, and may store a second master control plane address configuration and a second backup control plane address configuration in a second cache (or another type of data structure) on the second control plane component. Prior to detecting an event, the network device may store the first master control plane address configuration and the second backup control plane address configuration in an active state, and may store the first backup control plane address configuration and the second master control plane address configuration in an inactive or dormant state.

After storing the above-described configurations, the network device may detect an event associated with a first control plane component. Based on detecting the event, the network device may deactivate the first master control plane address configuration stored in the first cache on the first control plane component, and may activate the second master control plane address configuration stored in the second cache on the second control plane component. The network device may establish, using the activated second master control plane address configuration stored in the second cache on the second control plane component, a connection between the second control plane component and the data plane component included in the network device.

In this way, the network device activates and/or deactivates control plane address configurations stored on the first control plane component and the second control plane component, which conserves processing and networking resources that would otherwise be used to transfer the control plane address configurations between the first control plane component and the second control plane component based on the occurrence of an event. Moreover, in this way, if an event occurs, the network device is able to process the switchover between the first control plane component and the second control plane component in a way that prevents routing protocol traffic from being delayed and/or dropped altogether. This conserves memory, processing, and networking resources that would have otherwise been consumed on repairing additional network events and/or negative effects that would have occurred if the data plane component and/or a neighbor device determined that no master control plane is available in the network device and/or if the network device fails altogether. Moreover, this maintains network uptime and availability, as well as improves network reliability.

FIGS. 1A-1G are diagrams of an example implementation 100 described herein. As shown in FIGS. 1A-1G, example implementation 100 may include a network device. The network device may include various types of network devices, such a router, a gateway, a switch, a bridge, a wireless access point, a base station, and/or the like. The network device may be included in a network, such as a cellular network, a local area network (LAN), a core network, an access network, a wide area network (WAN) such as the Internet, a cloud network, and/or the like, along with other network devices.

The network device may include various components, such as a data plane component, a plurality of control plane components (e.g., control plane component 1, control plane component 2, etc.) (collectively referred to as the "control plane components" and individually as a "control plane component"), and/or the like. The data plane component may receive, process, and/or transmit data plane packets. A data plane packet may be a packet that travels through the network device, and is not originated or terminated at the network device. The data plane component may receive a data plane packet, perform a lookup in a FIB on the network device to identify forwarding information associated with the data plane packet (e.g., information identifying a destination of the data packet, information identifying a next hop in a route to the destination, and/or the like), and transmit the data plane packet to the next hop based on the forwarding information.

A control plane component may receive, process, and/or transmit control plane packets. A control plane packet may be a packet that is originated in a control plane component of the network device (i.e., generated by the network device) or terminated in a control plane component of the network device (i.e., the network device is the destination of the packet). In some implementations, a control plane packet may be generated at a neighbor device, and the network device may forward the control plane packet to another neighbor device. A control plane component may include various components, such as a FIB (e.g., FIB 1 included in control plane component 1, FIB 2 included in control plane component 2, etc.), a cache (e.g., cache 1 included in control plane component 1, cache 2 included in control plane component 2, etc.) or another type of data structure (e.g., a memory device, a storage device, etc.), and/or other elements.

A control plane component may perform various functions, such as populating a FIB included in the control plane component with forwarding information, maintaining the forwarding information stored in the FIB (e.g., updating the forwarding information stored in the FIB, removing forwarding information from the FIB, and/or the like), establishing and/or terminating a connection between the control plane component and another component in the network device (e.g., the data plane component, another control plane component, etc.) and/or between the control plane component and a device external to the network device, managing the data plane component, populating and maintaining a cache included in the control plane component, and/or the like.

A FIB (e.g., FIB 1, FIB 2, etc.) may be a data structure that stores forwarding information associated with one or more destinations in the network, in another network, and/or the like. The forwarding information associated with a destination may include information identifying an address of the destination (e.g., an Internet protocol (IP) address, a port address, and/or the like), information identifying a next hop in a route to the destination, information identifying an interface associated with the destination (e.g., a media access control (MAC) identifier), and/or the like.

In some implementations, a control plane component may populate and maintain the forwarding information in a FIB included in the control plane component based on various techniques. For example, the control plane component may learn routes in the network and/or updates to the routes in the network based on one or more routing protocols, such as a routing information protocol (RIP), an open shortest path first (OSPF) protocol, a border gateway protocol (BGP), an interior gateway routing protocol (IGRP), an enhanced IGRP (EIGRP), a distance-vector routing protocol, an intermediate system to intermediate system (IS-IS) protocol, and/or the like, and may store information identifying the routes and/or the updates to the routes, as forwarding information, in the FIB. In some implementations, the FIB may be populated with static forwarding information, which may be forwarding information configured and/or maintained by a user such as a network administrator. In some implementations, the control plane component may provide a copy of the FIB to the data plane component so that the data plane component may use the FIB to forward data packets received at the network device.

In some implementations, a control plane component may establish and/or terminate a connection between the control plane component and the data plane component, between the control plane component and another control plane component of a neighbor device, between the control plane component and another control plane component included in the network device, and/or the like. A connection between the control plane component and the data plane component or another control plane component may be used for a control plane session in which control plane packets are transmitted.

To establish a connection (e.g., between the control plane component and the data plane component), the control plane component may open a socket on the network device for the connection. The socket may be an endpoint of the connection on the network device, and may be associated with an address (e.g., an IP address, a port address, and/or the like) on the network device. In some implementations, the control plane component may establish the connection based on receiving a request (e.g., from the data plane component, from another control plane component, etc.) to establish the connection. In some implementations, the control plane component may establish the connection without receiving a request to establish the connection (i.e., the control plane component may initiate the connection). To terminate the connection, the control plane component may close the socket for the connection.

In some implementations, a control plane component may manage the data plane component by providing forwarding information in the FIB to the data plane component (e.g., to transmit data plane packets), monitoring the status of the data plane component, and/or the like. In some implementations, the control plane components and the data plane component may be communicatively connected via an internal connection (i.e., a connection internal to the network device, such as an internal Ethernet interface and/or the like). A control plane component may provide forwarding information to the data plane component on an internal connection between the control plane component and the data plane component.

In some implementations, a control plane component may monitor the status of the data plane component using the connection between the control plane component and the data plane component. For example, the control plane component and the data plane component may exchange one or more keepalive packets based on a threshold time interval, based on a threshold quantity of keepalive packets in a particular time interval, and/or the like. In some implementations, the network device may determine that the control plane component has failed if the data plane component does not receive a keepalive packet from the control plane component in a time interval that satisfies the threshold time interval, if the data plane component does not receive a quantity of keepalive packets from the control plane component in a particular time interval that satisfies the threshold quantity of keepalive packets, and/or the like. In some implementations, the network device may perform various actions based on determining that the control plane component has failed, such as switching the network device over to a another control plane component, providing an instruction to the network device to reset the network device, automatically resetting the network device, providing an instruction to the data plane component to reset the data plane component, automatically resetting the data plane component, generating and providing an alarm (i.e., a notification that an event has occurred in the network device), and/or the like.

A cache (e.g., cache 1, cache 2, etc.) may be included in a control plane component in a data structure separate from a FIB of the control plane component and/or may be included in a same data structure as the FIB. The cache may have a lookup queue that is separate from a lookup queue of the FIB, which prevents delays in FIB lookup times from impacting lookup times of the FIB cache. The network device may use the cache to store forwarding information for a subset of the destinations associated with the FIB. For example, the control plane component may use the cache to store forwarding information associated with a control plane role assigned to the control plane component.

In some implementations, the control plane components, included in the network device, may each be assigned a control plane role. For example, the network device may assign control plane component 1 a master control plane role, may assign control plane component 2 as a backup control plane role, and/or the like. The master control plane role may cause control plane component 1 to operate in an active state for the network device, whereas the backup control plane role may cause control plane component 2 to operate in a standby state. Accordingly, control plane component 1, as the master control plane for the network device, provides routing information and updates to the data plane component, controls the data plane component, and/or the like, whereas control plane component 2, as the backup control plane, may take over as the master control plane if an event occurs in control plane component 1 that causes the network device to switch over the master control plane role to control plane component 2.

In some implementations, each control plane role may be associated with a respective address and a respective address configuration. For example, the master control plane role may be associated with a master control plane address (e.g., an IP address, a port identifier, and/or the like) and a master control plane address configuration (e.g., the master control plane address, one or more destination addresses for one or more routing protocols associated with the master control plane address, a route prefix for the one or more destination addresses, a next hop associated with the one or more destination addresses, a logical interface associated with the one or more destination addresses, a physical interface associated with the one or more destination addresses, an incoming interface associated with the one or more destination addresses, and/or the like). As another example, the backup control plane role may be associated with a backup control plane address (e.g., an IP address, a port identifier, and/or the like) and a backup control plane address configuration (e.g., the backup control plane address, one or more destination addresses for one or more routing protocols associated with the backup control plane address, a route prefix for the one or more destination addresses, a next hop associated with the one or more destination addresses, a logical interface associated with the one or more destination addresses, a physical interface associated with the one or more destination addresses, an incoming interface associated with the one or more destination addresses, and/or the like).

Turning to FIG. 1A, the network device may assign a master control plane role to control plane component 1, and may assign a backup control plane role to control plane component 2. In some implementations, the network device may assign the roles to the control plane components randomly, based on a respective identifier associated with the control plane components (e.g., control plane component 1 may be assigned the master control plane role based on having a lower MAC address relative to control plane component 2), and/or the like. Accordingly, the network device may assign a master control plane address to control plane component 1, and may assign a backup control plane address to control plane component 2.

As shown by reference number 102, the network device may store various address configurations in cache 1 included in control plane component 1. For example, the network device may store, in cache 1, a first master control plane address configuration associated with the master control plane address assigned to control plane component 1 and a first backup control plane address configuration associated with the backup control plane address assigned to control plane component 2. In some implementations, the network device may obtain the information included in the first master control plane address configuration from FIB 1 included in control plane component 1, and may obtain the information included in the first backup control plane address configuration from FIB 2 included in control plane component 2.

As shown by reference number 104, the network device may similarly store various address configurations in cache 2 included in control plane component 2. For example, the network device may store, in cache 2, a second master control plane address configuration associated with the master control plane address assigned to control plane component 1 and a second backup control plane address configuration associated with the backup control plane address assigned to control plane component 2. In some implementations, the network device may obtain the information included in the second master control plane address configuration from FIB 1 included in control plane component 1, and may obtain the information included in the second backup control plane address configuration from FIB 2 included in control plane component 2.

In some implementations, the first master control plane address configuration stored in cache 1 may be the same as, or similar to, the second master control plane address configuration stored in cache 2. Similarly, the first backup control plane address configuration stored in cache 2 may be the same as, or similar to, the second backup control plane address configuration stored in cache 1. In this way, if an event occurs (e.g., an event associated with control plane component 1), and the network device determines to switch over the master control plane role to control plane component 2, control plane component 2 already has a master control plane address configuration (i.e., the second master control plane address configuration) stored on control plane component 2, and therefore does not need to obtain the master control plane address configuration from FIB 1 included in control plane component 1, which reduces the amount of time it takes to switch the master control plane role over to control plane component 2. For example, the time duration to complete a switchover by migrating control plane address configurations between control plane component 1 and control plane component 2 may occur on the order of seconds, whereas the time duration to complete a switchover by activating/deactivating copies of a master control plane address configuration and a backup control plane address configuration stored on control plane component 1 and control plane component 2, as described herein, may occur on the order of milliseconds.

In some implementations, the network device may periodically update the address configurations stored in cache 1 and/or cache 2. For example, the network device may detect a change to information, included in FIB 1, associated with the first and second master control plane address configurations, and may update the first and second master control plane address configurations to reflect the change. As another example, the network device may periodically refresh an address configuration included in cache 1 and/or cache 2 by re-obtaining all of the information included in the address configuration from either FIB 1 or FIB 2, and overwriting the address configuration stored in cache 1 and/or cache 2 with the re-obtained information.

Figure 1B:
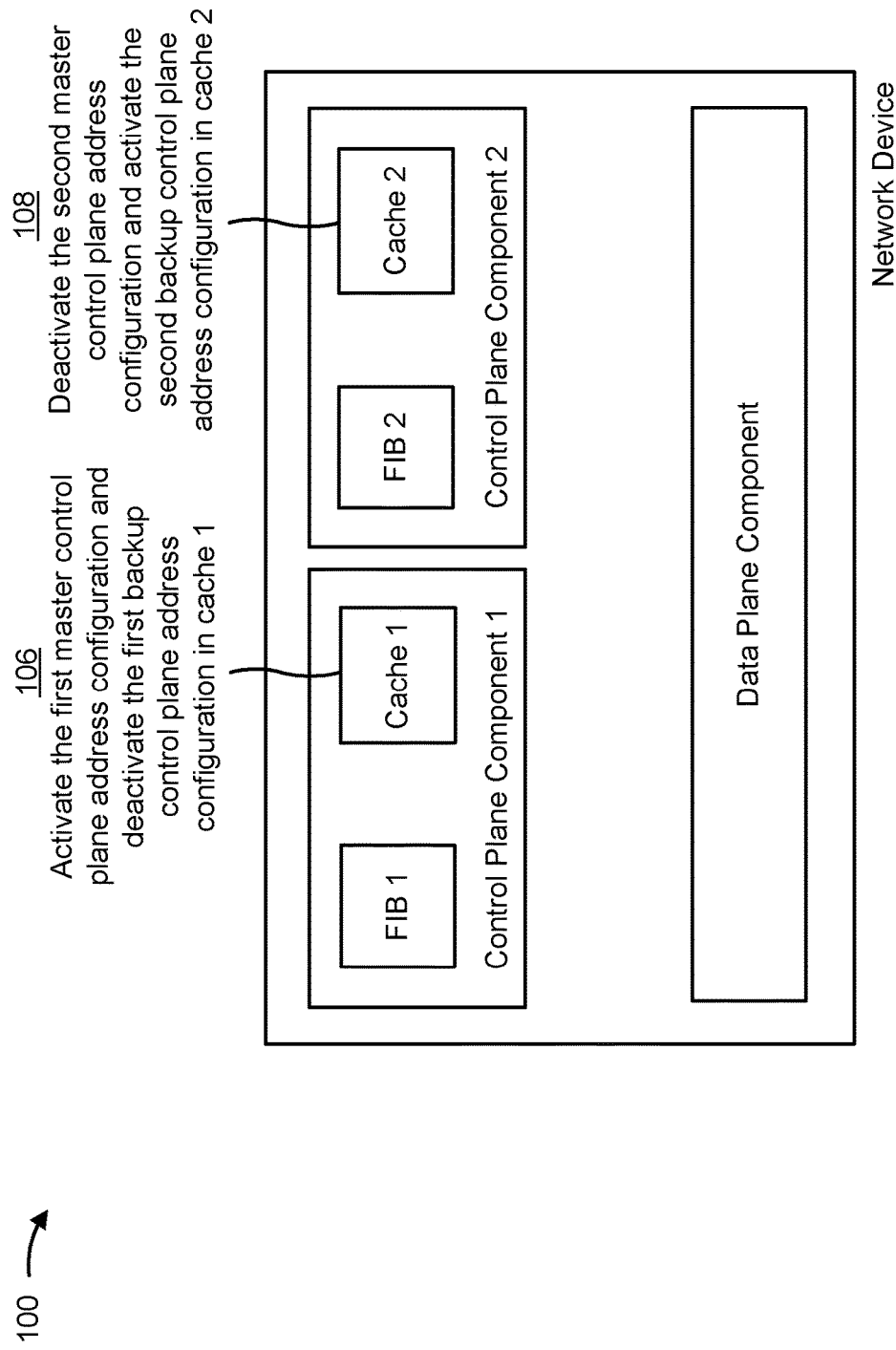

Turning to FIG. 1B, the network device may activate or deactivate an address configuration stored in a cache on a control plane component based on a control plane role assigned to the control plane component. As shown by reference number 106, since control plane component 1 is assigned the master control plane role, the network device may activate the first master control plane address configuration stored in cache 1, and may deactivate the first backup control plane address configuration stored in cache 1. For example, the network device may activate the first master control plane address configuration by including, in cache 1, information indicating that the first master control plane address configuration is active (e.g., by setting a value included in one or more fields associated with the first master control plane address configuration in cache 1 to a value that identifies the first master control plane address configuration as active, by assigning a label to the first master control plane address configuration that indicates the first master control plane address configuration is active, etc.). Similarly, the network device may deactivate the first backup control plane address configuration by including, in cache 1, information indicating that the first backup control plane address configuration is inactive (e.g., by setting a value included in one or more fields associated with the first backup control plane address configuration in cache 1 to a value that identifies the first backup control plane address configuration as inactive, by assigning a label to the first backup control plane address configuration that indicates the first backup control plane address configuration is inactive, etc.). Accordingly, control plane component 1 may use the first master control plane address configuration stored in cache 1 to process control plane packets based on the first master control plane address configuration being activated and may maintain the first backup control plane address configuration stored in cache 1 in an inactive state based on the first backup control plane address configuration being deactivated.

As shown by reference number 108, since control plane component 2 is assigned the backup control plane role, the network device may activate the second backup control plane address configuration stored in cache 2, and may deactivate the second master control plane address configuration stored in cache 2. For example, the network device may activate the second backup control plane address configuration by including, in cache 2, information indicating that the second backup control plane address configuration is active (e.g., by setting a value included in one or more fields associated with the second backup control plane address configuration in cache 2 to a value that identifies the second backup control plane address configuration as active, by assigning a label to the second backup control plane address configuration that indicates the second backup control plane address configuration is active, etc.). Similarly, the network device may deactivate the second master control plane address configuration by including, in cache 2, information indicating that the second master control plane address configuration is inactive (e.g., by setting a value included in one or more fields associated with the second master control plane address configuration in cache 2 to a value that identifies the second master control plane address configuration as inactive, by assigning a label to the second master control plane address configuration that indicates the second master control plane address configuration is inactive, etc.). Accordingly, control plane component 2 may use the second backup control plane address configuration stored in cache 2 to process control plane packets based on the second master control plane address configuration being activated and may maintain the second master control plane address configuration stored in cache 2 in an inactive state based on the second master control plane address configuration being deactivated.

Figure 1C:
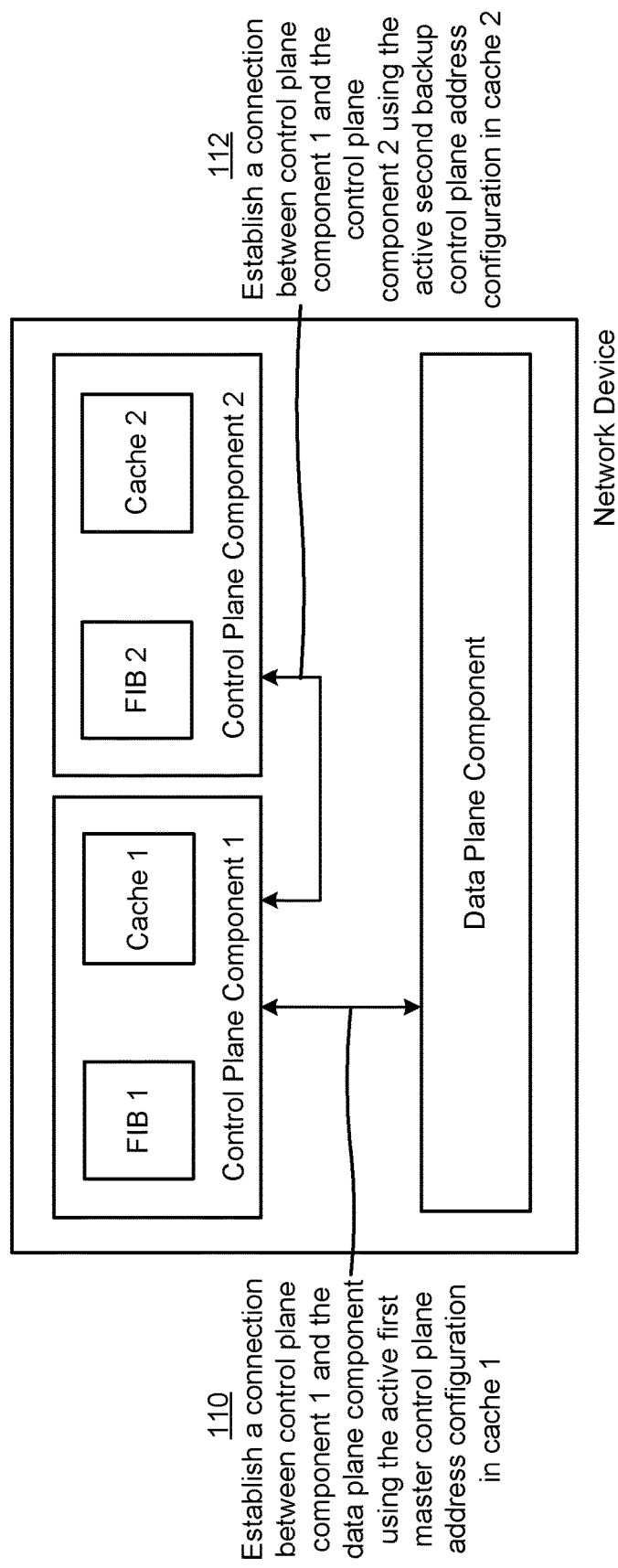

Turning to FIG. 1C, the network device may establish various connections based on activating and/or deactivating the address configurations stored in cache 1 and cache 2. As shown by reference number 110, the network device may establish a connection between control plane component 1 and the data plane component. For example, the network device may establish the connection between control plane component 1 and the data plane component using the active first master control plane address configuration stored in cache 1. In some implementations, the data plane component may transmit, to control plane component 1, a request to establish the connection between the data plane component and control plane component 1. The request may include a request to open a socket on control plane component 1 where the master control plane address assigned to control plane component 1 is an endpoint of the socket. Control plane component 1 may establish the connection between the data plane component and control plane component 1 based on receiving the request. Control plane component may establish the connection by opening the socket with the endpoint being the master control plane address. In some implementations, control plane component 1 may initiate establishment of the connection.

As shown by reference number 112, the network device may establish a connection between control plane component 1 and control plane component 2. For example, the network device may establish the connection between control plane component 1 and control plane component 2 using the active second backup control plane address configuration stored in cache 2. In some implementations, control plane component 2 may transmit, to control plane component 1, a request to establish the connection between control plane component 1 and control plane component 2. The request may include a request to open a socket on control plane component 1 where the master control plane address assigned to control plane component 1 is an endpoint of the socket. Control plane component 1 may establish the connection between control plane component 1 and control plane component 2 based on receiving the request. In some implementations, control plane component 1 may transmit the request to control plane component 2, and control plane component 2 may establish the connection by opening a socket on control plane component 2 with the endpoint being the backup control plane address.

Figure 1D:
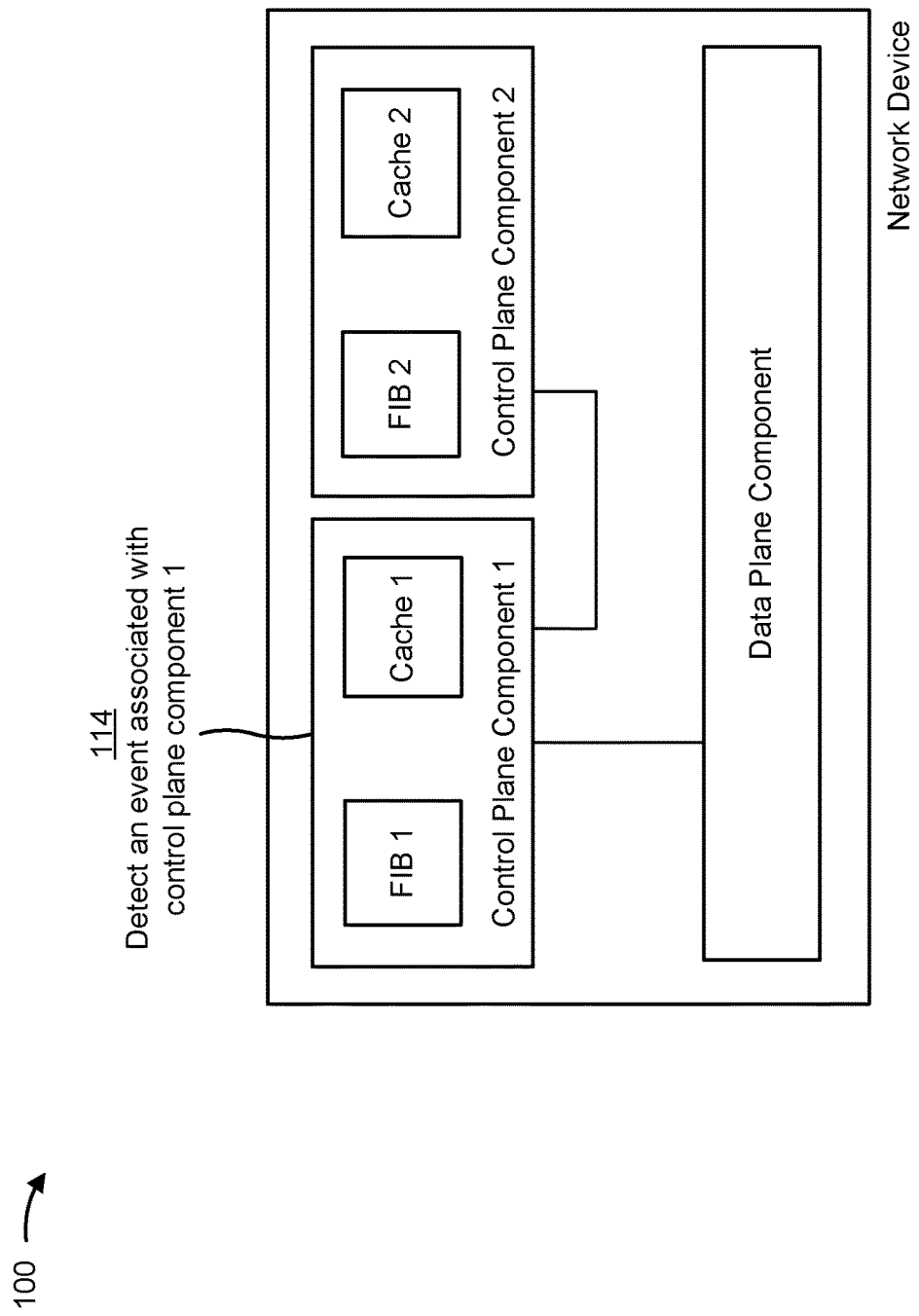

Turning to FIG. 1D, and as shown by reference number 114, the network device may detect an event associated with control plane component 1. In some implementations, the event may include a fault in the software of control plane component 1 (e.g., a virtual memory fault, a kernel fault in an operating system, etc.), a hardware fault in one or more hardware components of control plane component 1 (e.g., a memory fault, a processor fault, etc.), and/or the like. In some implementations, the event may include an event associated with a control plane routing protocol of control plane component 1 (e.g., BGP timeout, a BFD timeout, etc.). In some implementations, the event may include control plane component 1 receiving an instruction to perform a reset (i.e., to reset control plane component 1).

Figure 1E:
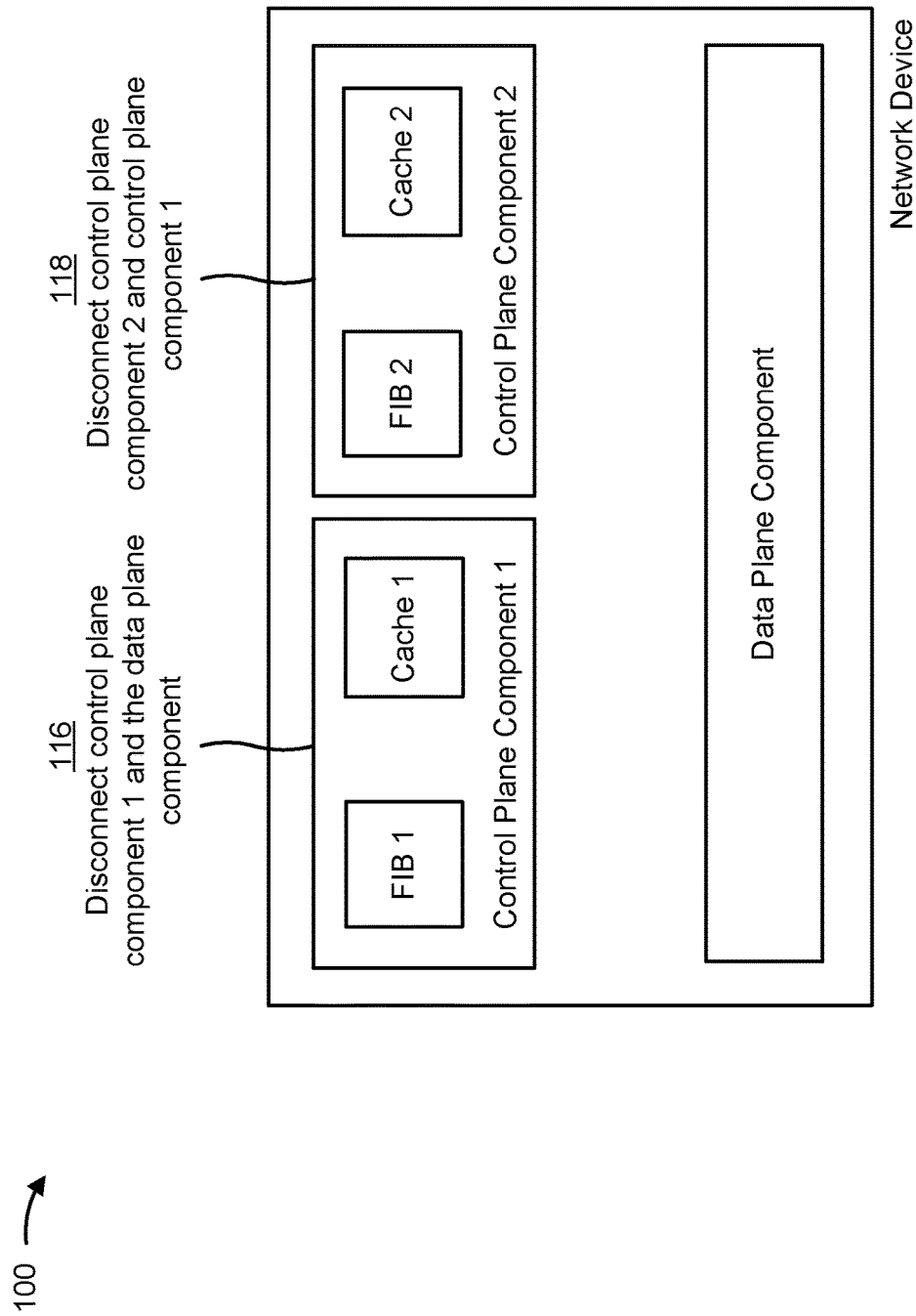

Turning to FIG. 1E, and as shown by reference number 116, the network device may disconnect control plane component 1 from the data plane component based on detecting the event. In some implementations, the network device may disconnect control plane component 1 from the data plane component by terminating the connection between control plane component 1 and the data plane component. For example, the network device may terminate the connection between control plane component 1 and the data plane component by closing the socket associated with the connection.

After disconnecting control plane component 1 from the data plane component, the network device may release the master control plane address from control plane component 1 such that control plane component 1 forfeits the master control plane address so that the master control plane address may be reassigned. The network device may reassign the master control plane address to control plane component 2. In this way, the network device switches control plane component 2 over to the master control plane role in the network device.

As shown by reference number 118, the network device may disconnect control plane component 2 from control plane component 1 based on detecting the event. In some implementations, the network device may disconnect control plane component 2 from control plane component 1 by terminating the connection between control plane component 2 and control plane component 1. For example, the network device may terminate the connection between control plane component 2 and control plane component 1 by closing a socket associated with the connection on control plane component 1 and/or closing a socket associated with the connection on control plane component 2.

In some implementations, after disconnecting control plane component 1 from the data plane component and/or disconnecting control plane component 2 from control plane component 1, the network device may release the backup control plane address from control plane component 2 such that control plane component 2 forfeits the backup control plane address so that the backup control plane address may be reassigned. The network device may reassign the backup control plane address to control plane component 1. In this way, the network device switches control plane component 1 over to the backup control plane role in the network device.

Figure 1F:
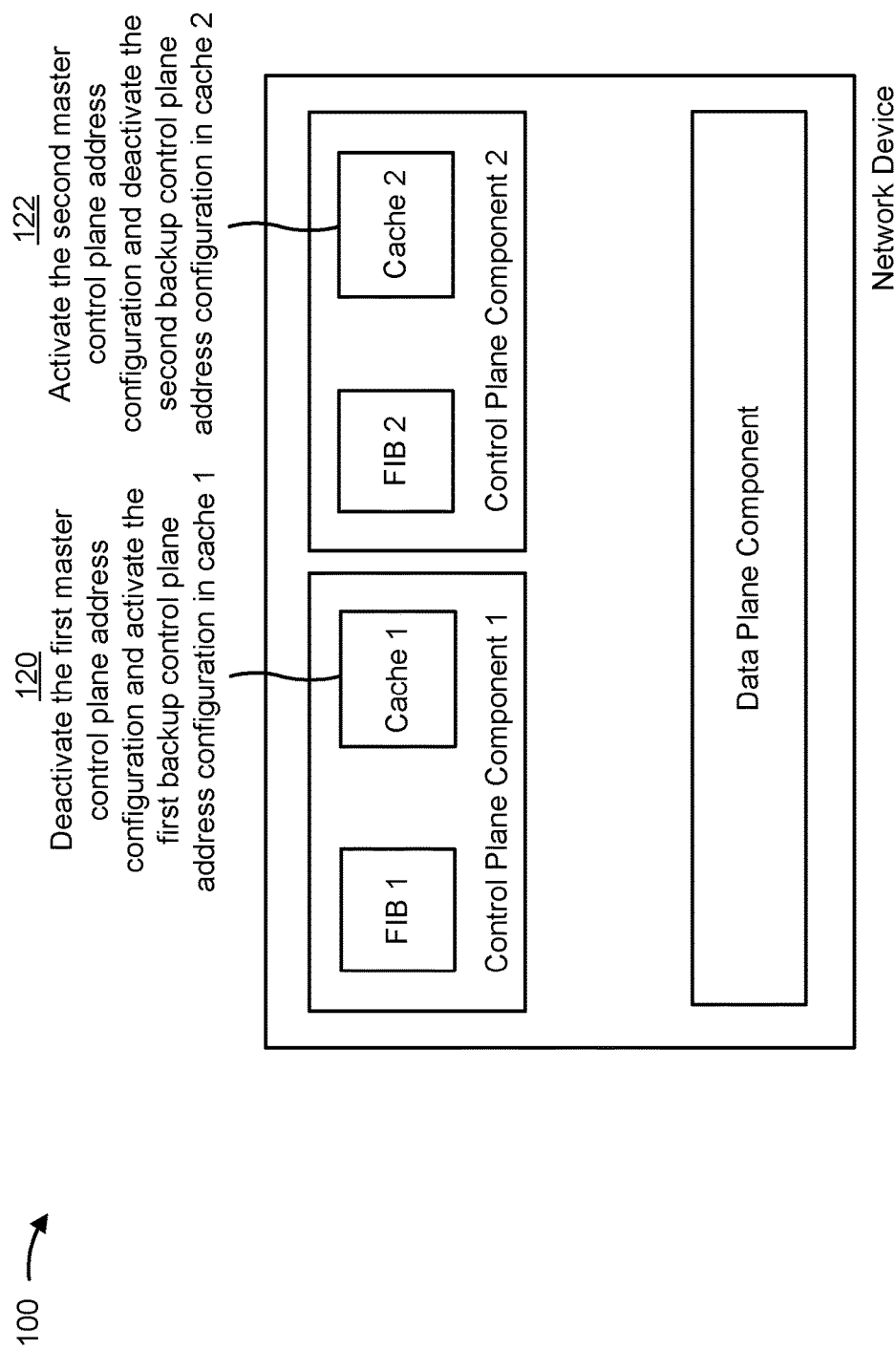

Turning to FIG. 1F, and as shown by reference number 120, based on the backup control plane role being assigned to control plane component 1, the network device may deactivate the first master control plane address configuration that was stored in cache 1 prior to the network device detecting the event, and may activate the first backup control plane address configuration stored in cache 1 prior to the network device detecting the event. For example, the network device may deactivate the first master control plane address configuration by replacing information indicating that the first master control plane address configuration stored in cache 1 on control plane component 1 is active with information indicating that the first master control plane address configuration stored in cache 1 is inactive (e.g., by changing a value included in one or more fields associated with the first master control plane address configuration in cache 1 to a value that identifies the first master control plane address configuration as inactive, by changing a label assigned to the first master control plane address configuration to a label that indicates the first master control plane address configuration is inactive, etc.). Similarly, the network device may activate the first backup control plane address configuration by replacing information indicating that the first backup control plane address configuration stored in cache 1 on control plane component 1 is inactive with information indicating that the first backup control plane address configuration stored in cache 1 is active (e.g., by changing a value included in one or more fields associated with the first backup control plane address configuration in cache 1 to a value that identifies the first backup control plane address configuration as active, by changing a label assigned to the first backup control plane address configuration to a label indicating the first backup control plane address configuration is active, etc.). Accordingly, control plane component 1 may use the first backup control plane address configuration stored in cache 1 to process control plane packets based on the first backup control plane address configuration being activated and may maintain the first master control plane address configuration stored in cache 1 in an inactive state based on the first master control plane address configuration being deactivated.

As shown by reference number 122, based on the master control plane role being assigned to control plane component 2, the network device may deactivate the second backup control plane address configuration stored in cache 2 (e.g., stored prior to the network device detecting the event), and may activate the second master control plane address configuration stored in cache 2 (e.g., stored prior to the network device detecting the event). For example, the network device may deactivate the second backup control plane address configuration by replacing information indicating that the second backup control plane address configuration stored in cache 2 on control plane component 2 is active with information indicating that the second backup control plane address configuration stored in cache 2 is inactive (e.g., by changing a value included in one or more fields associated with the second backup control plane address configuration in cache 2 to a value that identifies the second backup control plane address configuration as inactive, by changing a label assigned to the second backup control plane address configuration to a label that indicates the second backup control plane address configuration is inactive, etc.). Similarly, the network device may activate the second master control plane address configuration by replacing information indicating that the second master control plane address configuration stored in cache 2 on control plane component 2 is inactive with information indicating that the second master control plane address configuration stored in cache 2 is active (e.g., by changing a value included in one or more fields associated with the second master control plane address configuration in cache 2 to a value that identifies the second master control plane address configuration as active, by changing a label assigned to the second master control plane address configuration to a label that indicates the second master control plane address configuration is active, etc.). Accordingly, control plane component 2 may use the second master control plane address configuration stored in cache 2 to process control plane packets based on the second master control plane address configuration being activated and may maintain the second backup control plane address configuration stored in cache 2 in an inactive state based on the second backup control plane address configuration being deactivated.

Figure 1G:
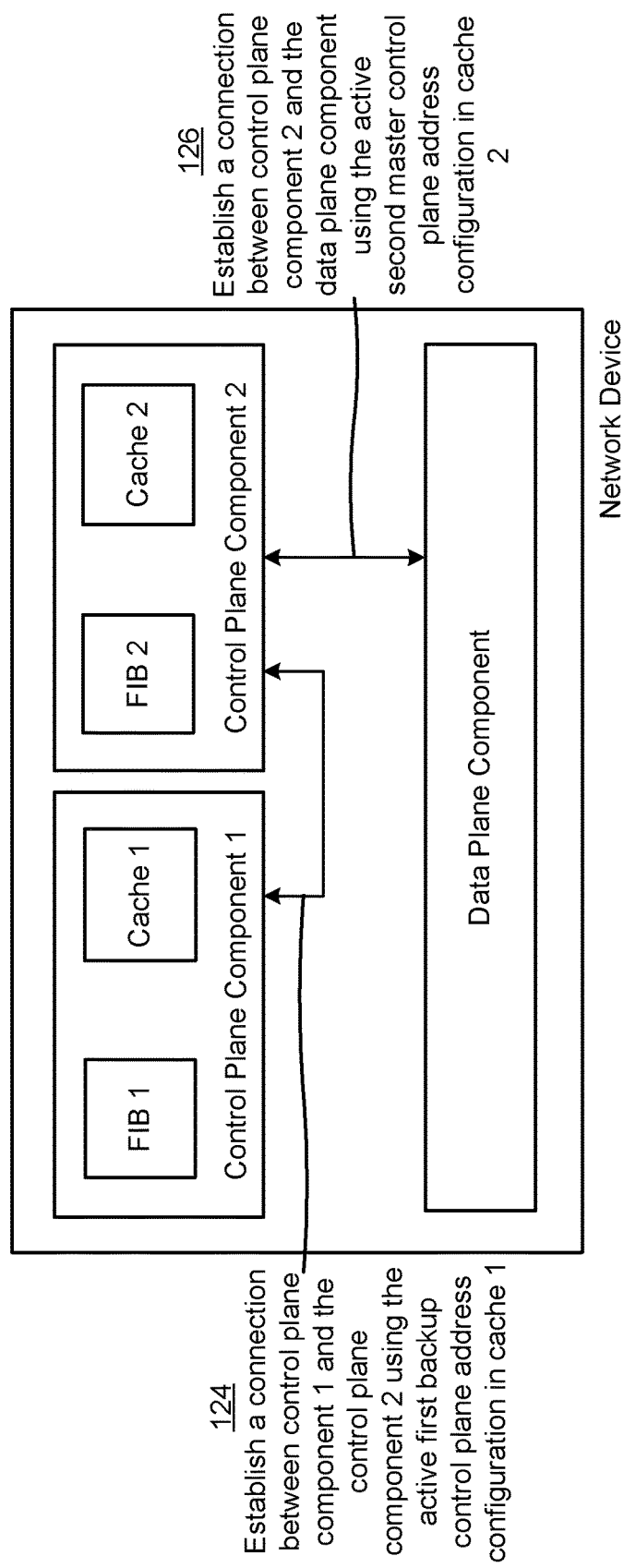

Turning to FIG. 1G, and as shown by reference number 124, the network device may establish a connection between control plane component 1 and control plane component 2 using the active first backup control plane address configuration stored in cache 1. For example, control plane component 1 may transmit a request to establish the connection with control plane component 2 based on the backup control plane address being assigned to control plane component 1, and control plane component 1 and control plane component 2 may establish the connection by opening a socket on control plane component 1 using the backup control plane address, included in the first backup control plane address configuration stored in cache 1, as an endpoint for the socket, and opening a socket on control plane component 2 using the master control plane address, included in the second master control plane address configuration stored in cache 2 as an endpoint for the socket.

As shown in reference number 126, the network device may establish a connection between control plane component 2 and the data plane component using the active second master control plane address configuration stored in cache 2. For example, the data plane component may attempt to reconnect to the master control plane address, and may therefore transmit a request to establish the connection with control plane component 2 based on the master control plane address being assigned to control plane component 2, and control plane component 2 may establish the connection by opening a socket on control plane component 2 using the master control plane address, included in the second master control plane address configuration stored in cache 2, as an endpoint for the socket. As another example, control plane component 2 may attempt to reconnect to the data plane component based on the network device assigning the master control plane address to control plane component 2.

In this way, to switch the master control plane role from control plane component 1 to control plane component 2, the network device may deactivate the first master control plane address configuration stored in cache 1 on control plane component 1 and activate the second master control plane address configuration stored in cache 2 on control plane component 2 instead of transferring the first master control plane address configuration from control plane component 1 to control plane component 2 based on the occurrence of an event. Similarly, to switch the backup control plane role from control plane component 2 to control plane component 1, the network device may activate the first backup control plane address configuration stored in cache 1 on control plane component 1 and deactivate the second backup control plane address configuration stored in cache 2 on control plane component 2 instead of transferring the second backup control plane address configuration from control plane component 2 to control plane component 1 based on the occurrence of the event. In this way, the network device reduces the time it takes for the network device to process the switchover of the master control plane role and the backup control plane role. Accordingly, when the event occurs, the network device is able to process the switchover in a way that prevents routing protocol traffic from being delayed and/or dropped altogether. This conserves memory, processing, and networking resources that would have otherwise been consumed on repairing additional network events and/or negative effects that would have occurred if the data plane component and/or a neighbor device determined that no master control plane is available in the network device and/or if the network device fails altogether. Moreover, this maintains network uptime and availability, as well as improves network reliability.

As indicated above, FIGS. 1A-1G are provided merely as an example. Other examples are possible and may differ from what was described with regard to FIGS. 1A-1G.

Figure 2:
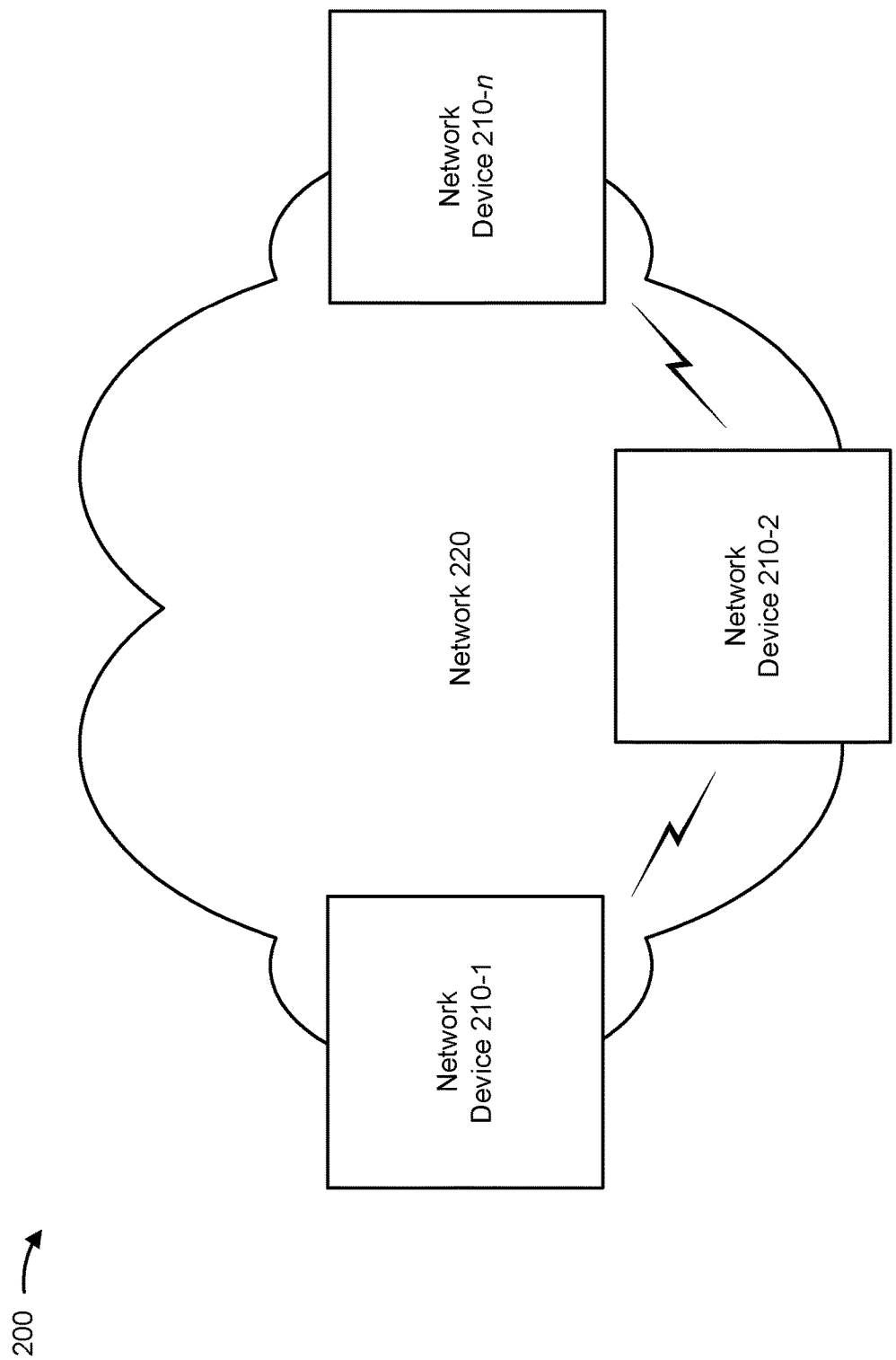
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-n (n≥1) (hereinafter referred to collectively as "network devices 210," and individually as "network device 210") and a network 220. Devices of environment 200 may interconnect via wired connections, wireless connections, or a combination of wired and wireless connections.

Network device 210 includes one or more devices capable of receiving, providing, storing, generating, and/or processing information. In some implementations, network device 210 may include a firewall, a router, a gateway, a switch, a bridge, a wireless access point, a base station (e.g., eNodeB, NodeB, gNodeB, and/or the like), and/or the like. In some implementations, network device 210 may be implemented as a physical device implemented within a housing, such as a chassis. In some implementations, network device 210 may be implemented as a virtual device implemented by one or more computer devices of a cloud computing environment or a data center.

In some implementations, network device 210 may include a data plane component, a first control plane component, and a second control plane component, as described herein. In practice, network device 210 may include one or more data plane components and two or more control plane components. Network device 210 may, using the first control plane component and/or the second control plane component, interact with the data plane component, such as via a control plane session associated with the data plane component. In some implementations, the first control plane component of network device 210 may include a first FIB and a first cache, and the second control plane component of network device 210 may include a second FIB and a second cache.

In some implementations, network device 210 may store, in the first cache, a first master control plane address configuration and a first backup control plane address configuration, and may store, in the second cache, a second master control plane address configuration and a second backup control plane address configuration. Network device 210 may activate the first master control plane address configuration and deactivate the first backup control plane address configuration stored in the first cache, and may activate the second backup control plane address configuration and deactivate the second master control plane address configuration stored in the second cache. Network device 210 may establish a connection between the first control plane component and the data plane component, establish a connection between the second control plane component and the data plane component, establish a connection between the first control plane component and the second control plane component, and/or the like.

In some implementations, network device 210 may detect an event associated with the first control plane component, disconnect the first control plane component and the data plane component, disconnect the second control plane component and the data plane component, disconnect the first control plane component and the second control plane component, and/or the like. Network device 210 may deactivate the first master control plane address configuration and activate the first backup control plane address configuration, and may deactivate the second backup control plane address configuration and activate the second master control plane address configuration.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of cellular network, etc.), a public land mobile network (PLMN), a LAN, a WAN, a metropolitan area network (MAN), a telephone network (e.g., a public switched telephone network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
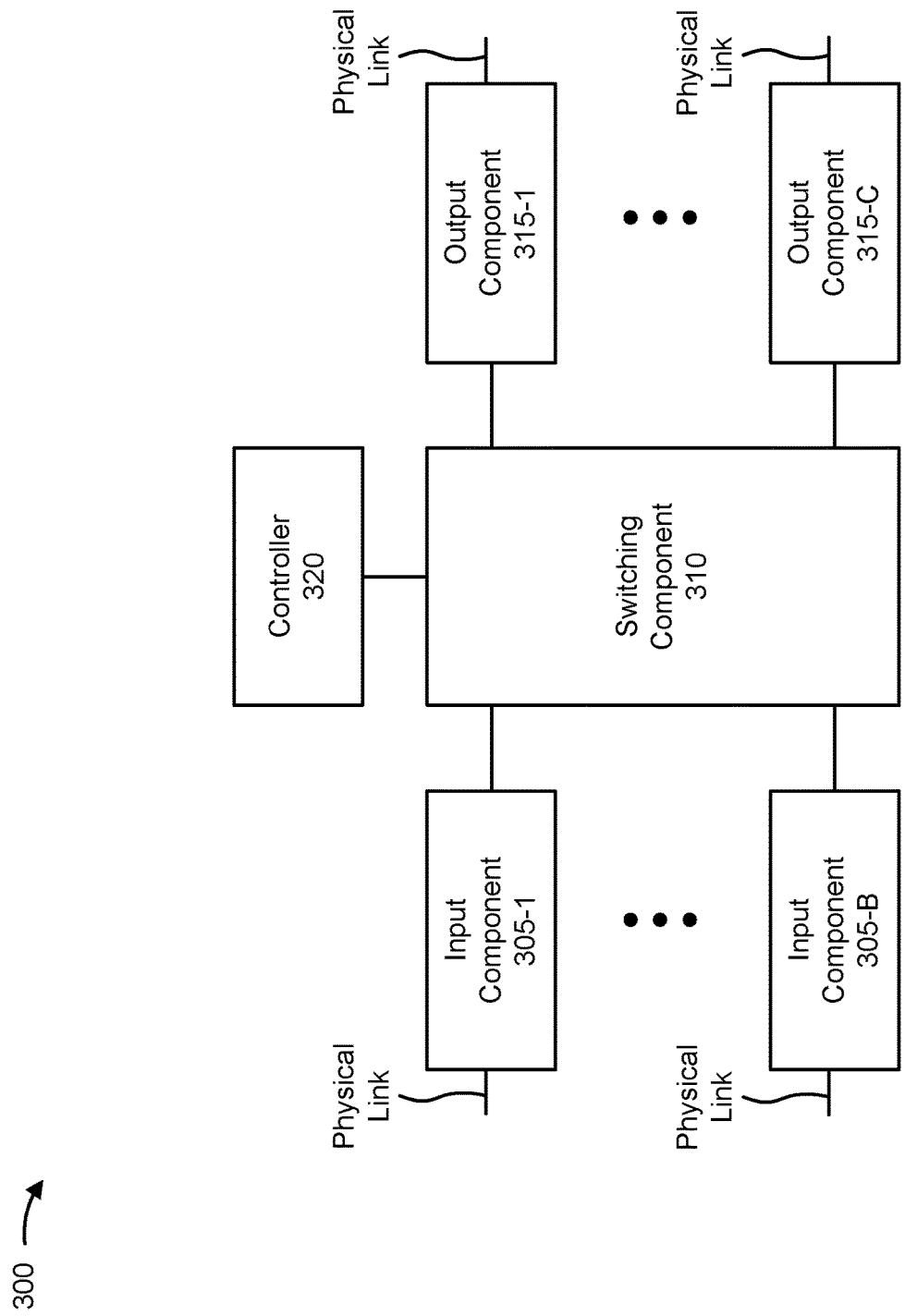
FIG. 3 is a diagram of example components of one or more devices of FIG. 2.

FIG. 3 is a diagram of example components of a device 300. Device 300 may correspond to one or more of network devices 210. In some implementations, one or more of network devices 210 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that may be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes based on executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
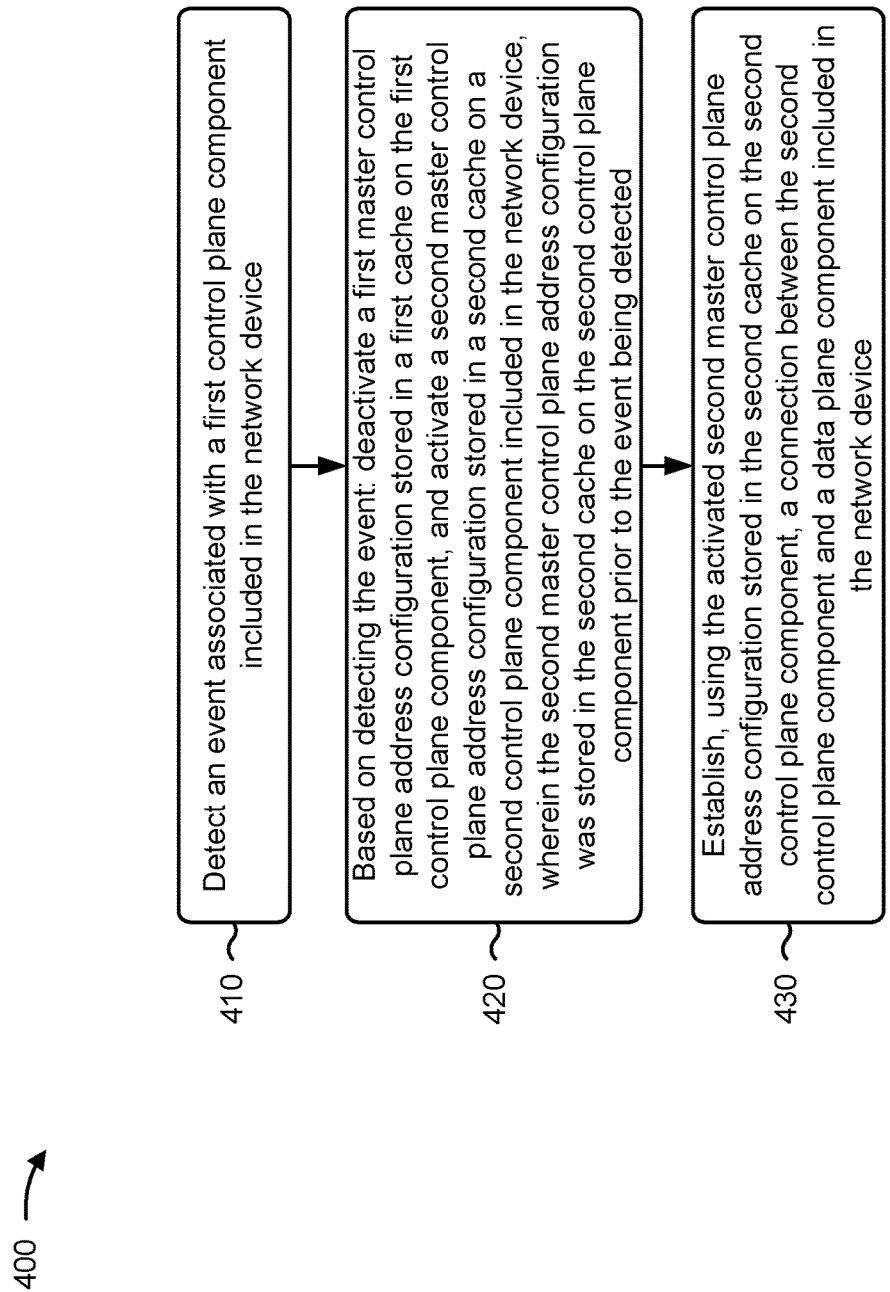
FIG. 4 is a flow chart of an example process for control plane switchover.

FIG. 4 is a flow chart of an example process 400 for control plane switchover. In some implementations, one or more process blocks of FIG. 4 may be performed by a network device (e.g., network device 210). In some implementations, one or more process blocks of FIG. 4 may be performed by a plurality of network devices, by another device, and/or by a group of devices separate from or including the network device.

As shown in FIG. 4, process 400 may include detecting an event associated with a first control plane component included in the network device (block 410). For example, the network device may (e.g., using input component 305, switching component 310, output component 315, controller 320, and/or the like) detect an event associated with a first control plane component included in the network device, as described above in connection with FIGS. 1A-1G.

As further shown in FIG. 4, process 400 may include, based on detecting the event, deactivating the first master control plane address configuration stored in the first cache on the first control plane component, and activating a second master control plane address configuration stored in a second cache on a second control plane component included in the network device, wherein the second master control plane address configuration was stored in the second cache on the second control plane component prior to the event being detected (block 420). For example, the network device (e.g., using input component 305, switching component 310, output component 315, controller 320, and/or the like) may, based on detecting the event, deactivate the first master control plane address configuration stored in the first cache on the first control plane component, and activate a second master control plane address configuration stored in a second cache on a second control plane component included in the network device, as described above in connection with FIGS. 1A-1G. In some implementations, the second master control plane address configuration may have been stored in the second cache on the second control plane component prior to the event being detected.

As further shown in FIG. 4, process 400 may include establishing, using the activated second master control plane address configuration stored in the second cache on the second control plane component, a connection between the second control plane component and a data plane component included in the network device (block 430). For example, the network device (e.g., using input component 305, switching component 310, output component 315, controller 320, and/or the like) may establish, using the activated second master control plane address configuration stored in the second cache on the second control plane component, a connection between the second control plane component and a data plane component included in the network device, as described above in connection with FIGS. 1A-1G.

Process 400 may include additional implementations, such as any single implementation or any combination of implementations described below and/or described with regard to any other process described herein.

In some implementations, the event may include a first failure associated with a routing protocol process of the first control plane component, and/or a second failure associated with a kernel of the first control plane component. In some implementations, the network device may, based on detecting the event, activate a first backup control plane address configuration stored in the first cache on the first control plane component, and deactivate a second backup control plane address configuration stored in the second cache on the second control plane component.

In some implementations, each of the first backup control plane address configuration and the second backup control plane address configuration may include information identifying a backup control plane address, a backup control plane logical interface, a backup control plane physical interface, and/or a backup control plane incoming interface. In some implementations, each of the first master control plane address configuration and the second master control plane address configuration may include information identifying a master control plane Internet protocol (IP) address, a master control plane route prefix, a master control plane next hop, and/or a master control plane logical interface.

In some implementations, the network device may, based on detecting the event, disconnect the first control plane component from the data plane component. In some implementations, when disconnecting the first control plane component from the data plane component, the network device may release a master control plane address from the first control plane component. In some implementations, the network device may release a backup control plane address from the second control plane component.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
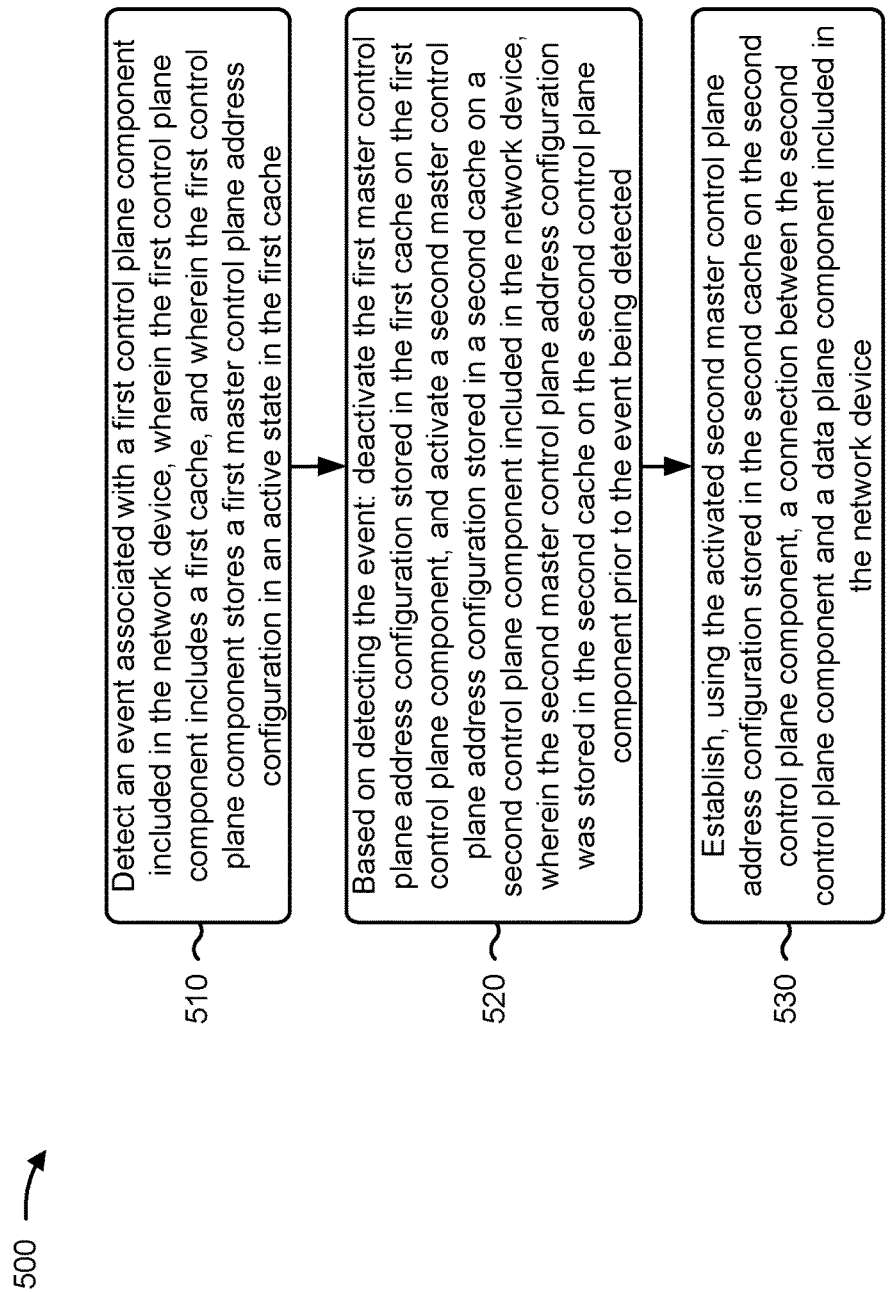
FIG. 5 is a flow chart of an example process for control plane switchover.

FIG. 5 is a flow chart of an example process 500 for control plane switchover. In some implementations, one or more process blocks of FIG. 5 may be performed by a network device (e.g., network device 210). In some implementations, one or more process blocks of FIG. 5 may be performed by a plurality of network devices, by another device, and/or by a group of devices separate from or including the network device.

As shown in FIG. 5, process 500 may include detecting an event associated with a first control plane component included in the network device (block 510). For example, the network device (e.g., using input component 305, switching component 310, output component 315, controller 320, and/or the like) may detect an event associated with a first control plane component included in the network device, as described above in connection with FIGS. 1A-1G. In some implementations, the first control plane component may include a first cache, and the first control plane component may store a first master control plane address configuration in an active state in the first cache.

As further shown in FIG. 5, process 500 may include, based on detecting the event, deactivating the first master control plane address configuration stored in the first cache on the first control plane component, and activating a second master control plane address configuration stored in a second cache on a second control plane component included in the network device, wherein the second master control plane address configuration was stored in the second cache on the second control plane component prior to the event being detected (block 520). For example, the network device (e.g., using input component 305, switching component 310, output component 315, controller 320, and/or the like) may, based on detecting the event, deactivate the first master control plane address configuration stored in the first cache on the first control plane component, and activate a second master control plane address configuration stored in a second cache on a second control plane component included in the network device, as described above in connection with FIGS. 1A-1G. In some implementations, the second master control plane address configuration may have been stored in the second cache on the second control plane component prior to the event being detected.

As further shown in FIG. 5, process 500 may include establishing, using the activated second master control plane address configuration stored in the second cache on the second control plane component, a connection between the second control plane component and a data plane component included in the network device (block 530). For example, the network device (e.g., using input component 305, switching component 310, output component 315, controller 320, and/or the like) may establish, using the activated second master control plane address configuration stored in the second cache on the second control plane component, a connection between the second control plane component and a data plane component included in the network device, as described above in connection with FIGS. 1A-1G.

Process 500 may include additional implementations, such as any single implementation or any combination of implementations described below and/or in connection with one or more other processes described elsewhere herein.

In some implementations, when deactivating the first master control plane address configuration stored in the first cache on the first control plane component, the network device may replace information, included in the first cache, indicating that the first master control plane address configuration stored in the first cache is active with information indicating that the first master control plane address configuration stored in the first cache is inactive.

In some implementations, when activating the second master control plane address configuration stored in the second cache on the second control plane component, the network device may replace information, included in the second cache, indicating that the second master control plane address configuration stored in the second cache is inactive with information indicating that the second master control plane address configuration stored in the second cache is active.

In some implementations, the network device may obtain the first master control plane address configuration from a forwarding information base (FIB) included in the first control plane component, obtain a first backup control plane address configuration from the FIB included in the first control plane component, and store, prior to detecting the event, the first master control plane address configuration and the first backup control plane address configuration in the first cache.

In some implementations, the network device may release a master control plane address from the first control plane component, and may assign the master control plane address to the second control plane component. In some implementations, the network device may release a backup control plane address from the second control plane component, and may assign the backup control plane address to the first control plane component.

In some implementations, when establishing the connection between the second control plane component and the data plane component, the network device may receive, from the data plane component, a request to establish the connection with the second control plane component, and may open, based on receiving the request, a socket on the second control plane component. In some implementations, an endpoint associated with the socket may be a master control plane address identified in the second master control plane address configuration.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for control plane switchover. In some implementations, one or more process blocks of FIG. 6 may be performed by a first network device (e.g., network device 210). In some implementations, one or more process blocks of FIG. 6 may be performed by a plurality of network devices, by another device, and/or by a group of devices separate from or including the first network device.

As shown in FIG. 6, process 600 may include detecting an event associated with a first control plane component included in the network device (block 610). For example, the network device (e.g., using input component 305, switching component 310, output component 315, controller 320, and/or the like) may detect an event associated with a first control plane component included in the network device, as described above in connection with FIGS. 1A-1G.

As further shown in FIG. 6, process 600 may include, based on detecting the event, deactivating a first master control plane address configuration stored in a first cache on the first control plane component, activating a first backup control plane address configuration stored in the first cache on the first control plane component, wherein the first backup control plane address configuration was stored in the first cache on the first control plane component prior to the event being detected, and activating a second master control plane address configuration stored in a second cache on a second control plane component included in the network device, wherein the second master control plane address configuration was stored in the second cache on the second control plane component prior to the event being detected (block 620). For example, the network device (e.g., using input component 305, switching component 310, output component 315, controller 320, and/or the like) may, based on detecting the event, deactivate a first master control plane address configuration stored in a first cache on the first control plane component, activate a first backup control plane address configuration stored in the first cache on the first control plane component, and activate a second master control plane address configuration stored in a second cache on a second control plane component included in the network device, as described above in connection with FIGS. 1A-1G. In some implementations, the first backup control plane address configuration may have been stored in the first cache on the first control plane component prior to the event being detected. In some implementations, the second master control plane address configuration may have been stored in the second cache on the second control plane component prior to the event being detected.

As further shown in FIG. 6, process 600 may include establishing, using the activated second master control plane address configuration stored in the second cache on the second control plane component, a connection between the second control plane component and a data plane component included in the network device (block 630). For example, the network device (e.g., using input component 305, switching component 310, output component 315, controller 320, and/or the like) may establish, using the activated second master control plane address configuration stored in the second cache on the second control plane component, a connection between the second control plane component and a data plane component included in the network device, as described above in connection with FIGS. 1A-1G.

Process 600 may include additional implementations, such as any single implementation or any combination of implementations described below and/or in connection with one or more other processes described elsewhere herein.

In some implementations, the network device may, based on detecting the event, deactivate a second backup control plane address configuration stored in the second cache on the second control plane component. In some implementations, when establishing the connection between the second control plane component and the data plane component, the network device may receive, from the data plane component, a request to establish the connection with the second control plane component, and may open, based on receiving the request, a socket on the second control plane component. In some implementations, an endpoint associated with the socket may be a master control plane address identified in the activated second master control plane address configuration.

In some implementations, the network device may obtain the second master control plane address configuration from a forwarding information base (FIB) included in the second control plane component, may obtain a second backup control plane address configuration from the FIB included in the second control plane component, and may store the second master control plane address configuration and the second backup control plane address configuration in the second cache.

In some implementations, the first master control plane address configuration may include information identifying a master control plane address, a master control plane route prefix, a master control plane next hop, and/or a master control plane logical interface. In some implementations, the first backup control plane address configuration includes information may include a backup control plane address, a backup control plane route prefix, a backup control plane next hop, and/or a backup control plane logical interface.

In some implementations, the network device may release a master control plane address from the first control plane component, assign the master control plane address to the second control plane component, release a backup control plane address from the second control plane component, and assign the backup control plane address to the first control plane component.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a network device 210 that is capable of reducing the time it takes to switch over a master control plane address configuration from a first control plane component to second control plane component. Network device 210 may store a first master control plane address configuration and a first backup control plane address configuration in a first cache (or another type of data structure) on the first control plane component, and may store a second master control plane address configuration and a second backup control plane address configuration in a second cache (or another type of data structure) on the second control plane component. Prior to detecting an event, network device 210 may store the first master control plane address configuration and the second backup control plane address configuration in an active state, and may store the first backup control plane address configuration and the second master control plane address configuration in an inactive or dormant state.

After storing the above-described configurations, network device 210 may detect an event associated with a first control plane component. Based on detecting the event, network device 210 may deactivate the first master control plane address configuration stored in the first cache on the first control plane component, and may activate the second master control plane address configuration stored in the second cache on the second control plane component. Network device 210 may establish, using the activated second master control plane address configuration stored in the second cache on the second control plane component, a connection between the second control plane component and the data plane component included in network device 210.

In this way, network device 210 activates and/or deactivates control plane address configurations stored on the first control plane component and the second control plane component, which conserves processing and networking resources that would otherwise be used to transfer the control plane address configurations between the first control plane component and the second control plane component based on the occurrence of an event. Moreover, in this way, if an event occurs, network device 210 is able to process the switchover between the first control plane component and the second control plane component in a way that prevents routing protocol traffic from being delayed and/or dropped altogether. This conserves memory, processing, and networking resources that would have otherwise been consumed on repairing additional network events and/or negative effects that would have occurred if the data plane component and/or a neighbor device determined that no master control plane is available in network device 210 and/or if network device 210 fails altogether. Moreover, this maintains network uptime and availability, as well as improves network reliability.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

A conjunction used with regard to two or more alternatives (e.g., "or" or "and/or") is intended to be interpreted as inclusive (e.g., "and/or") rather than exclusive with regard to the two or more alternatives, irrespective of which form of the conjunction is predominately used herein, unless language to override this interpretation is used (e.g., "only one of" etc.).

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more memories; and
one or more processors to:
 detect an event associated with a first control plane component included in the network device;
 based on detecting the event:
  deactivate a first master control plane address configuration stored in a first cache on the first control plane component, and
  activate a second master control plane address configuration stored in a second cache on a second control plane component included in the network device,
   wherein the second master control plane address configuration was stored in the second cache on the second control plane component prior to the event being detected; and
 establish, using the activated second master control plane address configuration stored in the second cache on the second control plane component, a connection between the second control plane component and a data plane component included in the network device.

2. The network device of claim 1, wherein the event includes at least one of:
a first failure associated with a routing protocol process of the first control plane component, or
a second failure associated with a kernel of the first control plane component.

3. The network device of claim 1, wherein the one or more processors are further to:
based on detecting the event:
 activate a first backup control plane address configuration stored in the first cache on the first control plane component, and
 deactivate a second backup control plane address configuration stored in the second cache on the second control plane component.

4. The network device of claim 3, wherein each of the first backup control plane address configuration and the second backup control plane address configuration include information identifying at least one of:
a backup control plane address,
a backup control plane logical interface,
a backup control plane physical interface, or
a backup control plane incoming interface.

5. The network device of claim 1, wherein each of the first master control plane address configuration and the second master control plane address configuration include information identifying at least one of:
a master control plane Internet protocol (IP) address,
a master control plane route prefix,
a master control plane next hop, or
a master control plane logical interface.

6. The network device of claim 1, wherein the one or more processors are further to:
based on detecting the event:
 disconnect the first control plane component from the data plane component.

7. The network device of claim 6, wherein the one or more processors, when disconnecting the first control plane component from the data plane component, are to:
release a master control plane address from the first control plane component; and
wherein the one or more processors are further to:
 release a backup control plane address from the second control plane component.

8. A non-transitory computer-readable medium storing instructions, the instructions comprising:
one or more instructions that, when executed by one or more processors of a network device, cause the one or more processors to:
 detect an event associated with a first control plane component included in the network device,
  wherein the first control plane component includes a first cache, and
  wherein the first control plane component stores a first master control plane address configuration in an active state in the first cache;
 based on detecting the event:
  deactivate the first master control plane address configuration stored in the first cache on the first control plane component, and
  activate a second master control plane address configuration stored in a second cache on a second control plane component included in the network device,
   wherein the second master control plane address configuration was stored in the second cache on the second control plane component prior to the event being detected; and
 establish, using the activated second master control plane address configuration stored in the second cache on the second control plane component, a connection between the second control plane component and a data plane component included in the network device.

9. The non-transitory computer-readable medium of claim 8, wherein the one or more instructions, that cause the one or more processors to deactivate the first master control plane address configuration stored in the first cache on the first control plane component, cause the one or more processors to:
replace information, included in the first cache, indicating that the first master control plane address configuration stored in the first cache is active with information indicating that the first master control plane address configuration stored in the first cache is inactive.

10. The non-transitory computer-readable medium of claim 8, wherein the one or more instructions, that cause the one or more processors to activate the second master control plane address configuration stored in the second cache on the second control plane component, cause the one or more processors to:
  replace information, included in the second cache, indicating that the second master control plane address configuration stored in the second cache is inactive with information indicating that the second master control plane address configuration stored in the second cache is active.

11. The non-transitory computer-readable medium of claim 8, wherein the one or more instructions, when executed by the one or more processors, further cause the one or more processors to:
  obtain the first master control plane address configuration from a forwarding information base (FIB) included in the first control plane component;
  obtain a first backup control plane address configuration from the FIB included in the first control plane component; and
  store, prior to detecting the event, the first master control plane address configuration and the first backup control plane address configuration in the first cache.

12. The non-transitory computer-readable medium of claim 8, wherein the one or more instructions, when executed by the one or more processors, further cause the one or more processors to:
  release a master control plane address from the first control plane component; and
  assign the master control plan address to the second control plane component.

13. The non-transitory computer-readable medium of claim 8, wherein the one or more instructions, when executed by the one or more processors, further cause the one or more processors to:
  release a backup control plane address from the second control plane component; and
  assign the backup control plane address to the first control plane component.

14. The non-transitory computer-readable medium of claim 8, wherein the one or more instructions, that cause the one or more processors to establish the connection between the second control plane component and the data plane component, cause the one or more processors to:
  receive, from the data plane component, a request to establish the connection with the second control plane component; and
  open, based on receiving the request, a socket on the second control plane component,
    wherein an endpoint associated with the socket is a master control plane address identified in the second master control plane address configuration.

15. A method, comprising:
  detecting, by a network device, an event associated with a first control plane component included in the network device;
  based on detecting the event:
    deactivating, by the network device, a first master control plane address configuration stored in a first cache on the first control plane component,
    activating, by the network device, a first backup control plane address configuration stored in the first cache on the first control plane component,
      wherein the first backup control plane address configuration was stored in the first cache on the first control plane component prior to the event being detected, and
    activating, by the network device, a second master control plane address configuration stored in a second cache on a second control plane component included in the network device,
      wherein the second master control plane address configuration was stored in the second cache on the second control plane component prior to the event being detected;
  establishing, by the network device using the activated second master control plane address configuration stored in the second cache on the second control plane component, a connection between the second control plane component and a data plane component included in the network device.

16. The method of claim 15, further comprising:
  based on detecting the event:
    deactivating a second backup control plane address configuration stored in the second cache on the second control plane component.

17. The method of claim 15, wherein establishing the connection between the second control plane component and the data plane component comprises:
  receiving, from the data plane component, a request to establish the connection with the second control plane component; and
  opening, based on receiving the request, a socket on the second control plane component,
    wherein an endpoint associated with the socket is a master control plane address identified in the activated second master control plane address configuration.

18. The method of claim 15, further comprising:
  obtaining the second master control plane address configuration from a forwarding information base (FIB) included in the second control plane component;
  obtaining a second backup control plane address configuration from the FIB included in the second control plane component; and
  storing the second master control plane address configuration and the second backup control plane address configuration in the second cache.

19. The method of claim 15, wherein the first master control plane address configuration includes information identifying at least one of:
  a master control plane address,
  a master control plane route prefix,
  a master control plane next hop, or
  a master control plane logical interface, and
    wherein the first backup control plane address configuration includes information identifying at least one of:
      a backup control plane address,
      a backup control plane route prefix,
      a backup control plane next hop, or
      a backup control plane logical interface.

20. The method of claim 15, further comprising:
  releasing a master control plane address from the first control plane component;
  assigning the master control plane address to the second control plane component;
  releasing a backup control plane address from the second control plane component; and assigning the backup control plane address to the first control plane component.

\* \* \* \* \*